(12) United States Patent
Baek et al.

(10) Patent No.: US 10,845,640 B2
(45) Date of Patent: Nov. 24, 2020

(54) LIQUID CRYSTAL DISPLAY DEVICE

(71) Applicant: SAMSUNG SDI CO., LTD., Yongin-si (KR)

(72) Inventors: Il Woong Baek, Suwon-si (KR); Yeon Ju Jung, Suwon-si (KR); Han Saem Kang, Suwon-si (KR); Yoo Jin Kim, Suwon-si (KR); Han Su Kim, Suwon-si (KR); Dong Yoon Shin, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 16/638,054

(22) PCT Filed: Jul. 10, 2018

(86) PCT No.: PCT/KR2018/007814
§ 371 (c)(1),
(2) Date: Feb. 10, 2020

(87) PCT Pub. No.: WO2019/031713
PCT Pub. Date: Feb. 14, 2019

(65) Prior Publication Data
US 2020/0174313 A1 Jun. 4, 2020

(30) Foreign Application Priority Data
Aug. 10, 2017 (KR) .......................... 10-2017-0101908

(51) Int. Cl.
*G02F 1/1335* (2006.01)

(52) U.S. Cl.
CPC .... *G02F 1/133528* (2013.01); *G02F 2201/50* (2013.01)

(58) Field of Classification Search
CPC ............. G02F 1/133528; G02F 1/1335; G02F 2201/50
See application file for complete search history.

(56) References Cited

U.S. PATENT DOCUMENTS

2006/0062934 A1* 3/2006 Hayashi ............... G02B 5/3083
428/1.31
2006/0177680 A1* 8/2006 Lee ........................ G02B 5/305
428/509
(Continued)

FOREIGN PATENT DOCUMENTS

JP 2014-44387 A 3/2014
JP 2016-143046 A 8/2016
(Continued)

*Primary Examiner* — Hoan C Nguyen
(74) *Attorney, Agent, or Firm* — Lewis Roca Rothgerber Christie LLP

(57) ABSTRACT

Provided is a liquid crystal display device having a viewing-side polarizing plate, a liquid crystal panel and a light source-side polarizing plate, which are stacked sequentially, wherein the viewing-side polarizing plate comprises a first polarizer and a first protective film formed on a light output surface of the first polarizer, the light source-side polarizing plate comprises a second polarizer and a fourth protective film formed on a light incident surface of the second polarizer, and the TD shrinkage ratio of the fourth protective film is greater than the TD shrinkage ratio of the first protective film.

13 Claims, 1 Drawing Sheet

(56) References Cited

U.S. PATENT DOCUMENTS

| | | | | |
|---|---|---|---|---|
| 2007/0258032 A1* | 11/2007 | Kaihoko | ........... | G02F 1/133514 |
| | | | | 349/141 |
| 2014/0178706 A1* | 6/2014 | Park | ........................ | G02B 1/14 |
| | | | | 428/480 |
| 2015/0029587 A1* | 1/2015 | Iida | ........................... | C08J 5/18 |
| | | | | 359/489.07 |

FOREIGN PATENT DOCUMENTS

| | | |
|---|---|---|
| KR | 10-2010-0102292 A | 9/2010 |
| KR | 10-2016-0002902 A | 1/2016 |
| KR | 10-2016-0027500 A | 3/2016 |
| KR | 10-2016-0081138 A | 7/2016 |
| KR | 10-1669320 B1 | 10/2016 |

\* cited by examiner

[FIG. 1]
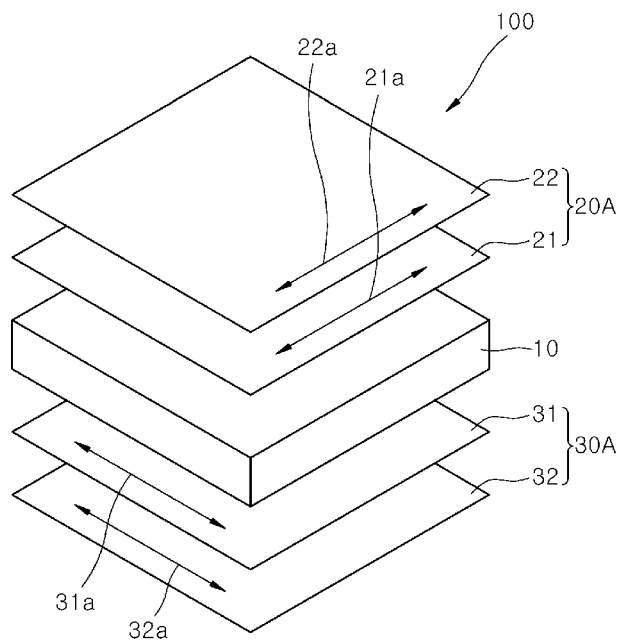
[FIG. 2]
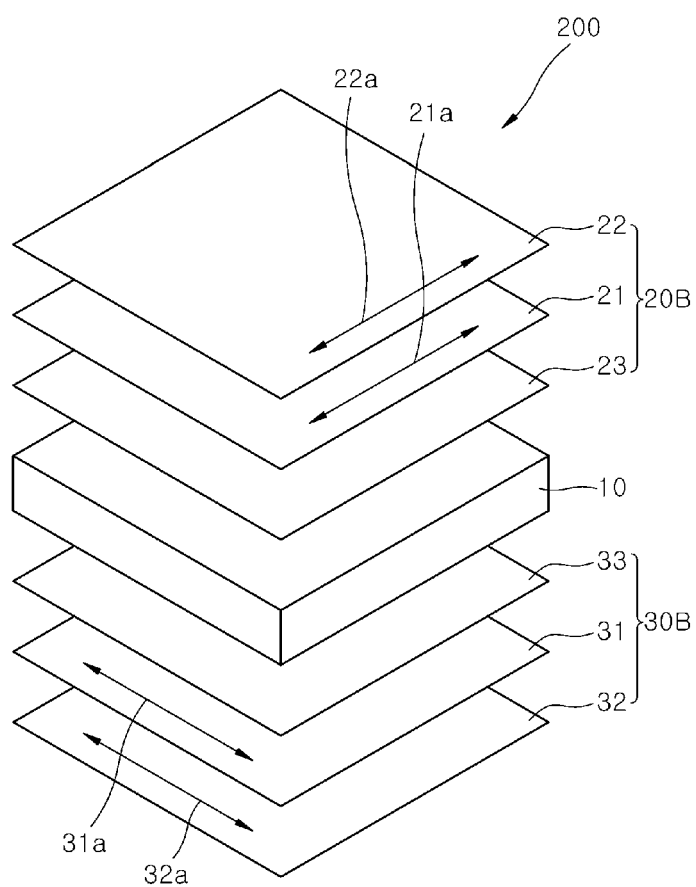

LIQUID CRYSTAL DISPLAY DEVICE

CROSS-REFERENCE TO RELATED APPLICATIONS

This application is a U.S. National Phase Patent Application of International Application Number PCT/KR2018/007814, filed on Jul. 10, 2018, which claims priority to Korean Patent Application Number 10-2017-0101908, filed on Aug. 10, 2017, the entire contents of both of which are incorporated herein by reference.

TECHNICAL FIELD

Embodiments relate to a liquid crystal display device. More particularly, embodiments relate to a liquid crystal display device capable of improving optical effect such as rainbow mura and warpage of a liquid crystal panel.

BACKGROUND ART

A liquid crystal display device generally includes a polarizing plate in which a protective film is adhered to a polarizer, as an essential element. As the protective film of the polarizer, a triacetyl cellulose film is usually used. However, when the triacetyl cellulose film is thin, sufficient mechanical strength may not be obtained, and moisture permeability may become high. Thus, the polarizer is easily deteriorated. In addition, the triacetyl cellulose film is expensive. Therefore, an inexpensive alternative material is required.

A polyester film is inexpensive and may replace the triacetyl cellulose film. However, the polyester film has birefringence, and rainbow mura may be visually recognized. A method of raising an in-plane retardation of the polyester film to prevent the rainbow mura is known. However, in a liquid crystal display device, polarizing plates are laminated on both surfaces of a liquid crystal panel, and an absorption axis of a polarizer of a viewer side polarizing plate and an absorption axis of a polarizer of a light source side polarizing plate are substantially orthogonal to each other. Thus, the liquid crystal panel may have warpage when the liquid crystal panel is left at a high temperature. Therefore, a method of suppressing the rainbow mura while improving warpage of the liquid crystal panel is needed.

Related art is disclosed in Japanese Patent Laid-Open Publication No. 2014-044387.

DISCLOSURE

Technical Problem

One object of the present invention is to provide a liquid crystal display device capable of improving warpage of a liquid crystal panel.

Another object of the present invention is to provide a liquid crystal display device capable of showing improved optical effect such as rainbow mura suppression.

Technical Solution

The embodiments may be realized by a liquid crystal display device including a viewer side polarizing plate including a first polarizer and a first protective film formed on a light exit surface of the first polarizer; a liquid crystal panel; and a light source side polarizing plate including a second polarizer and a fourth protective film formed on a light incident surface of the second polarizer, wherein the viewer side polarizing plate, the liquid crystal panel, and the light source side polarizing plate are sequentially stacked, and wherein a TD (transverse direction) shrinkage of the fourth protective film is greater than a TD shrinkage of the first protective film.

Advantageous Effects

The present invention provides a liquid crystal display device capable of improving warpage of a liquid crystal panel is provided.

The present invention provides a liquid crystal display device capable of showing improved optical defect such as rainbow mura suppression is provided.

BRIEF DESCRIPTION OF THE DRAWINGS

FIG. 1 is an exploded perspective view of a liquid crystal display device according to an embodiment of the invention.

FIG. 2 is an exploded perspective view of a liquid crystal display device according to another embodiment of the invention.

BEST MODE

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. In the drawings, portions irrelevant to the description will be omitted for clarity. Like components will be denoted by like reference numerals throughout the specification.

As used herein, spatially relative terms such as "upper" and "lower" are defined with reference to the accompanying drawings. Thus, it is understood that the term "upper" can be used interchangeably with the term "lower". It is understood that when an element such as a layer, film, region or substrate is referred to as being placed "on" another element, it can be placed directly on the other element, or intervening layer(s) may be present. On the other hand, when an element is referred to as being placed "directly on" another element, no intervening layer is present between two elements.

As used herein, "in-plane retardation $R_e$" is represented by following Formula 1, and "retardation in thickness direction $R_{th}$" is represented by following Formula 2. In addition, "degree of biaxiality (NZ)" is represented by following Formula 3:

$$R_e = (n_x - n_y) \times d \quad \text{[Formula 1]}$$

wherein, $n_x$ and $n_y$ are refractive indexes in a slow axis direction and a fast axis direction of a protective film of a polarizer at a wavelength of 550 nm, respectively, and d is a thickness of the protective film of the polarizer (unit: nm), $$R_{th} = ((n_x + n_y)/2 - n_z) \times d \quad \text{[Formula 2]}$$

wherein, $n_x$, $n_y$ and $n_z$ are refractive indexes in a slow axis direction, a fast axis direction, and a thickness direction of a protective film of a polarizer at a wavelength of 550 nm, respectively, and d is a thickness of the protective film of the polarizer (unit: nm), $$NZ = (n_x - n_z)/(n_x - n_y) \quad \text{[Formula 3]}$$

wherein, $n_x$, $n_y$, and $n_z$ are refractive indexes in a slow axis direction, a fast axis direction, and a thickness direction of a protective film of a polarizer at a wavelength of 550 nm, respectively.

As used herein, "(meth)acryl" refers to acryl and/or methacryl.

As used herein, "viewer side polarizing plate" refers to a polarizing plate which is disposed to face an observer, that is in an opposite position of a light source with respect to a liquid crystal panel of a liquid crystal display device.

As used herein, "light source side polarizing plate" refers to a polarizing plate which is disposed on a light source side of a liquid crystal display device.

As used herein, "MD shrinkage (machine direction shrinkage)" and "TD shrinkage (transverse direction shrinkage)" of a protective film are obtained by treating a square shape specimen obtained by cutting the protective film in 150 mm×150 mm (MD×TD) size for 30 minutes at 120° C., followed by calculating according to Formulae 4A and 4B, respectively:

$$MD\ shrinkage=|L_2-L_1|/L_1 \times 100 \quad \text{[Formula 4A]}$$

wherein, $L_1$ is an initial length of the specimen in MD, and $L_2$ is a length in MD after treating the specimen at 120° C. for 30 minutes, $$TD\ shrinkage=|L_4-L_3|/L_3 \times 100 \quad \text{[Formula 4B]}$$

wherein, $L_3$ is an initial length of the specimen in TD, and $L_4$ is a length in TD after treating the specimen at 120° C. for 30 minutes.

The MD shrinkage and the TD shrinkage may be measured for a protective film having a thickness of 60 μm to 120 μm.

As used herein, "MD shrinkage" and "TD shrinkage" of a polarizing plate are obtained by treating a square shape specimen obtained by cutting a polarizer of the polarizing plate in 150 mm×150 mm (MD×TD) size for 30 minutes at 120° C., followed by calculating according to Formulae 5A and 5B, respectively $$MD\ shrinkage=|L_2-L_1|/L_1 \times 100 \quad \text{[Formula 5A]}$$

wherein, $L_1$ is an initial length of the specimen in MD, and $L_2$ is a length in MD after treating the specimen at 120° C. for 30 minutes, $$TD\ shrinkage=|L_4-L_3|/L_3 \times 100 \quad \text{[Formula 5B]}$$

wherein, $L_3$ is an initial length of the specimen in TD, and $L_4$ is a length in TD after treating the specimen at 120° C. for 30 minutes.

The MD shrinkage and the TD shrinkage may be measured for a polarizing plate having a thickness of 160 μm to 200 μm.

The inventors have controlled TD shrinkages of a polyester protective film formed on a light exit surface of a polarizer in a viewer side polarizing plate and a polyester protective film formed on a light incident surface of a polarizer in a light source side polarizing plate. Thus, optical effect such as rainbow mura and warpage of a liquid crystal panel have improved.

Hereinafter, a liquid crystal display device according to an embodiment of the invention will be described with reference to FIG. 1. FIG. 1 is an exploded perspective view of a liquid crystal display device according to an embodiment of the invention.

Referring to FIG. 1, a liquid crystal display device 100 may include a liquid crystal panel 10, a viewer side polarizing plate 20A, and a light source side polarizing plate 30A.

Although not shown in FIG. 1, the liquid crystal display device 100 may include a backlight unit under the light source side polarizing plate 30A. The backlight unit may include a conventional backlight unit known to those skilled in the art. For example, the backlight unit may include a light source, a light guide plate, a reflection plate, a diffusion plate, an optical sheet, and the like.

Referring to FIG. 1, the viewer side polarizing plate 20A may include a first polarizer 21 and a first protective film 22 formed on an upper surface of the first polarizer 21. The light source side polarizing plate 30A may include a second polarizer 3 1and a fourth protective film 32 formed on a lower surface of the second polarizer 31.

An absorption axis 21a of the first polarizer 21 and an absorption axis 31a of the second polarizer 31 are substantially orthogonal to each other. As a result, efficiency of the light emitted from a backlight unit may increase. Each of the first protective film 22 and the fourth protective film 32 may include a polyester protective film. Thus, each of the first protective film 22 and the fourth protective film 32 may have high birefringence. In exemplary embodiments, an in-plane retardation of each of the first protective film 22 and the fourth protective film 32 is increased to improve rainbow mura. As described in the following, the first protective film 22 and the fourth protective 32 film may be produced by uniaxially stretching in TD and then being subjected to different treatments, respectively. This will be described in detail below.

In exemplary embodiments, the absorption axis 21a of the first polarizer 21 and an MD 22a of the first protective film 22 are substantially parallel with each other, and the absorption axis 31a of the second polarizer 31 and an MD 32a of the fourth protective film 32 are substantially parallel with each other. This is because coincidence of the optical axes of the polarizer and the protective film may suppress degradation of a polarization degree of a polarizer. In exemplary embodiments, TD shrinkage of the fourth protective film 32 is greater than TD shrinkage of the first protective film 22. Thus, warpage of the liquid crystal panel may be remarkably improved. Referring to FIG. 1, the MD of the first polarizer 21 and the MD of the first protective film 22 are substantially parallel with each other, and the MD of the second polarizer 31 and the MD of the fourth protective film 32 are substantially parallel with each other. Therefore, both the viewer side polarizing plate 20A and the light source side polarizing plate 30A may shrink in MD. In the viewer side polarizing plate 20A, an MD is a longer side of the viewer side polarizing plate 20A and in the light source side polarizing plate 30A, a TD is a longer side of the light source side polarizing plate 30A. Thus, the liquid crystal panel 10 may have warpage toward the viewer side polarizing plate 20A. In this embodiment, TD shrinkage of the fourth protective film 32 is greater than TD shrinkage of the first protective film 22. Thus, warpage of the liquid crystal panel may improve while rainbow mura being suppressed. The rainbow mura is related to an in-plane retardation of a protective film and is also related to a method of preparing the protective film as well as TD shrinkage of the protective film. In exemplary embodiments, MD shrinkage of the first protective film 22 and MD shrinkage of the fourth protective film 32 are equal to each other, and TD shrinkage of the fourth protective film 32 is greater than TD shrinkage of the first protective film 22. Thus, warpage of the liquid crystal panel may improve while rainbow mura being suppressed.

In exemplary embodiments, a TD shrinkage difference represented by Formula 6 may be in a range of about 0.1% to about 0.4%, for example about 0.1% to about 0.3%.

Within this range, warpage of a liquid crystal panel may improve and rainbow mura may be suppressed:

*TD shrinkage difference=TD shrinkage of fourth protective film−TD shrinkage of first protective film* [Formula 6]

The first protective film 22 may be formed on the upper surface of the first polarizer 21 to protect the first polarizer 21 and improve rainbow mura and warpage of a liquid crystal panel. The first protective film 22 may be formed on the light exit surface of the first polarizer 21.

The first protective film 22 may be an optically transparent film including a polyester-based resin. The first protective film 22 may include a polyester-based resin exhibiting birefringence. The first protective film 22 may include at least one resin selected from the group consisting of polyethylene terephthalate, polyethylene naphthalate, polybutylene naphthalate and polybutylene terephthalate.

The first protective film 22 may have MD shrinkage which is greater than TD shrinkage. The first protective film 22 may have TD shrinkage of about 0.1% or less and MD shrinkage of about 0.7% to about 0.9%. Within this range, warpage of a liquid crystal panel may improve and rainbow mura may also be suppressed even at a high temperature. The first protective film 22 may have a value of (MD shrinkage−TD shrinkage) in a range of about 0.6% to about 0.9%. Within this range, warpage of a liquid crystal panel may improve and rainbow mura may also be suppressed even at a high temperature.

The first protective film 22 may have an in-plane retardation of about 5,000 nm or more, for example about 5,000 nm to about 15,000 nm, about 5,000 nm to about 12,000 nm, about 5,000 nm to about 11,000 nm, about 5,000 nm to about 10,000 nm, and about 6,000 nm to about 9,000 nm, at a wavelength of 550 nm. Within this range, rainbow mura may be suppressed. The first protective film 22 may have a retardation in thickness direction of about 15,000 nm or less, for example about 10,000 nm to about 13,000 nm, at a wavelength of 550 nm. The first protective film 22 may have a degree of biaxiality of about 1.8 or less, for example about 1.0 to about 1.8, at a wavelength of 550 nm. Within these ranges of the retardation in thickness direction and the degree of biaxiality, it will be possible to remove stains caused by birefringence of the protective film.

An in-plane retardation difference between the first protective film 22 and the fourth protective film 32 at a wavelength of 550 nm may be about 800 nm or less, for example about 50 nm to about 800 nm. Within this range, visibility of rainbow mura may be reduced.

The first protective film 22 may have a thickness of about 25 μm to about 200 μm, for example about 25 μm to about 100 μm. Within this range, the film may be used as a protective film of a polarizer.

The fourth protective film 32 may be formed on the lower surface of the second polarizer 31 to protect the second polarizer 31 and improve rainbow mura and warpage of a liquid crystal panel. The fourth protective film 32 may be formed on the light incident surface of the second polarizer 31.

The fourth protective film 32 may be an optically transparent film including a polyester-based resin. The fourth protective film 32 may include a polyester-based resin exhibiting birefringence. The fourth protective film 32 may include at least one resin selected from the group consisting of polyethylene terephthalate, polyethylene naphthalate, polybutylene naphthalate and polybutylene terephthalate.

The fourth protective film 32 may include the same resin with the first protective film 22 or a resin different from the first protective film 22.

The fourth protective film 32 may have MD shrinkage greater than TD shrinkage. The fourth protective film 32 may have TD shrinkage of about 0.3% to about 0.4% and MD shrinkage of about 0.7% to about 0.9%. Within this range, warpage of a liquid crystal panel may improve and rainbow mura may also be suppressed even at a high temperature. The fourth protective film 32 may have a value of (MD shrinkage−TD shrinkage) in a range of about 0.3% to about 0.6%. Within this range, warpage of a liquid crystal panel may improve and rainbow mura may also be suppressed even at a high temperature.

The fourth protective film 32 may have an in-plane retardation of about 5,000 nm or more, for example about 5,000 nm to about 15,000 nm, about 5,000 nm to about 12,000 nm, about 5,000 nm to about 11,000 nm, about 5,000 nm to about 10,000 nm, and about 6,000 nm to about 9,000 nm, at a wavelength of 550 nm. Within this range, rainbow mura may be suppressed. The fourth protective film 32 may have a retardation in thickness direction of about 15,000 nm or less, for example about 10,000 nm to about 13,000 nm, at a wavelength of 550 nm. The fourth protective film 32 may have a degree of biaxiality of about 1.8 or less, for example about 1.0 to about 1.8, at a wavelength of 550 nm. Within these ranges of the retardation in thickness direction and the degree of biaxiality, it will be possible to remove stains caused by birefringence of the protective film.

The fourth protective film 32 may have a thickness of about 25 μm to about 200 μm, for example about 25 μm to about 100 μm. Within this range, the film may be used as a protective film of a polarizer.

The first protective film 22 may be prepared by stretching a film in TD only without stretching in MD (a first step), and then stretching the film in TD by heating at a predetermined range of temperature while simultaneously lowering a degree of stretching (tension-relaxation step, a second step) to increase an in-plane retardation of the film at a wavelength of 550 nm.

In the first step, a TD stretching ratio may be about 2 to about 10, and an MD stretching ratio may be about 1 to about 1.1. The MD stretching ratio of about 1 to about 1.1 means that there is no further stretching step except for stretching by a mechanical process. The MD stretching ratio of about 1 means a non-stretched state of a film. By stretching a film in the above ranges of the TD stretching ratio and the MD stretching ratio, an in-plane retardation of a protective film may increase to improve rainbow mura and image quality. In exemplary embodiments, the TD stretching ratio may be about 3 to about 8. As used herein, "stretching ratio" means a ratio of a length of a film after stretching in a stretching direction to an initial length of the film in a stretching direction. The stretching process may be carried out by at least one of dry stretching and wet stretching. A stretching temperature may be in a range of about (Tg−20° C.) to about (Tg+50° C.), specifically about 70° C. to about 150° C., more specifically about 80° C. to about 130° C., more specifically about 90° C. to about 120° C. Within this range, uniform stretching may be obtained.

In the second step, TD stretching may be performed by heating the film at a predetermined range of temperature while simultaneously lowering the degree of stretching (tension-relaxation). This leads to crystallization and stabilization of the film. In the second step, the heating process may be carried out at a temperature not lower than a glass transition temperature Tg of a polyester resin, for example at about 100° C. to about 300° C., for about 1 second to about 2 hours, in an oven. The TD stretching ratio may be in a range of about 0 to about 3, specifically, about 0.1 to about 2, more specifically about 0.1 to about 1.

The second step may be carried out one or more times in the production of the first protective film 22. The fourth protective film 32 may have higher TD shrinkage than that of the first protective film 22 by not performing the second step after the first step or reducing the number of times of performing the second step in comparison to the production of the first protective film 22. In exemplary embodiments, the fourth protective film 32 may be produced without performing the second step after the first step is performed. As a result, warpage of a liquid crystal panel may be improved and rainbow mura may be suppressed.

Each of the first protective film 22 and the fourth protective film 32 may further include a primer layer on the protective film. The primer layer may improve adhesion of the protective film and make the protective film be more securely adhered to a polarizer. The primer layer may be formed directly on a polyester film. A triacetyl cellulose film may securely adhere to a polarizer even though a primer layer is not included. However, a polyester film may not be securely adhered to a polarizer. The polyester film may be adhered to a polarizer after being modified by the primer layer. The primer layer may have a refractive index of about 1.0 to about 1.6, specifically about 1.1 to about 1.6, about 1.2 to about 1.6, about 1.3 to about 1.6, about 1.4 to about 1.6, about 1.5 to about 1.6. Within this range, the primer layer may be used for an optical film and have an appropriate refractive index with respect to the polyester film. The primer layer may have a thickness of about 1 nm to about 200 nm, specifically about 60 nm to about 200 nm. Within this range, the primer layer may be used for an optical film and may have an appropriate refractive index with respect to a base film. Thus, transmittance of a protective film of a polarizer may increase and brittle phenomenon may be reduced. The primer layer may be a non-urethane primer layer which does not include a urethane group. Specifically, the primer layer may include a composition for a primer layer including a monomer or a resin such as polyester and acryl. The above described range of refractive index may be obtained by controlling a mixing ratio (e.g., molar ratio) of the monomer. The composition for the primer layer may further include at least one additive such as a UV absorber, an antistatic agent, a defoaming agent, and a surfactant.

The first protective film 22 may further include a functional layer on the surface of the protective film. The functional layer may impart at least one of glare, anti-glare, anti-reflection, low reflection, hard coating, anti-fingerprint, anti-contamination, diffusion, and refraction functions to the protective film. In exemplary embodiments, the functional layer may include a hard coating layer.

Each of the first protective film 22 and the fourth protective film 32 may have light transmittance of about 80% or more, specifically about 85% to about 95% in a visible light region (e.g., at a wavelength of 380 nm to 780 nm). Within this range, the film may be used for a polarizing plate.

The first polarizer 21 may polarize an incident light from the liquid crystal panel 10 and then output the polarized light to the first protective film 22. The second polarizer 31 may polarize a light that has passed through the fourth protective film 32 from a backlight unit, and then output the polarized light to the liquid crystal panel 10.

Each of the first polarizer 21 and the second polarizer 31 may include a conventional polarizer known to those skilled in the art. Specifically, the first polarizer 21 and the second polarizer 31 may include a polyvinyl alcohol-based polarizer produced by uniaxially stretching a polyvinyl alcohol-based film or a polyene-based polarizer produced by dehydrating a polyvinyl alcohol-based film. Each of the first polarizer 21 and the second polarizer 31 may have a thickness of about 5 μm to about 40 μm. Within this range, the polarizer may be used in a liquid crystal display device.

The viewer side polarizing plate 20A may have a value of (MD shrinkage−TD shrinkage) in a range of about 0.4% to about 0.6%. The viewer side polarizing plate 20A may have MD shrinkage of about 0.5% to about 0.6% and TD shrinkage of about 0.1% or less. The light source side polarizing plate 30A may have a value of (MD shrinkage−TD shrinkage) in a range of about 0.1% to about 0.3%. The light source side polarizing plate 30A may have MD shrinkage of about 0.5% to about 0.6% and TD shrinkage of about 0.3% to about 0.4%. Within these ranges, warpage of a liquid crystal panel may be improved and rainbow mura may be suppressed.

The above ranges of the MD shrinkage and the TD shrinkage of the viewer side polarizing plate 20A may be realized by including the above-described first protective film 22 on one surface of a polarizer and a second protective film described below on another surface of the polarizer. The above ranges of the MD shrinkage and the TD shrinkage of the light source side polarizing plate 30A may be realized by including the above-described fourth protective film 32 on one surface of a polarizer and a third protective film described below on another surface of the polarizer.

Each of the viewer side polarizing plate 20A, and the light source side polarizing plate 30A may have a thickness of about 150 μm to about 400 μm. Within this range, the polarizing plate may be used in an optical display device.

The liquid crystal panel 10 may include a first substrate, a second substrate, and a liquid crystal layer disposed between the first substrate and the second substrate. The liquid crystal panel may adopt a vertical alignment (VA) mode, a patterned vertical alignment (PVA) mode, or a super-patterned vertical alignment (s-PVA) mode, without being limited thereto.

Although not shown in FIG. 1, an adhesive layer may be formed between the first polarizer 21 and the first protective film 22, and between the second polarizer 31 and the fourth protective film 32 to adhere the polarizer to the protective film. The adhesive layer may include a conventional adhesive (water-based or photopolymerizable) known to those skilled in the art.

Hereinafter, a liquid crystal display device according to another embodiment of the invention will be described with reference to FIG. 2. FIG. 2 is an exploded perspective view of a liquid crystal display device according to another embodiment of the invention.

Referring to FIG. 2, the liquid crystal display device of the embodiment is substantially the same with the above described liquid crystal display device according to an embodiment of the invention, except that a viewer side polarizing plate 20B further includes a second protective film 23 formed on a light incident surface of a first polarizer 21, and a light source side polarizing plate 30B further includes a third protective film 33 formed on a light exit surface of a second polarizer 31.

The second protective film 23 and the third protective film 33 may protect the polarizer or provide an optical compensation function. Each of these optical films may include an optically transparent resin. Examples of the resins may include polyester including polyethylene terephthalate (PET), polybutylene terephthalate, polyethylene naphthalate, polybutylene naphthalate and the like, cellulose ester including acryl, cyclic olefin polymer (COP), triacetyl cellulose (TAC) and the like, polyvinyl acetate, polyvinyl chloride (PVC), polynorbonene, polycarbonate (PC), polyamide, polyacetal, polyphenylene ether, polyphenylene sulfide, polysulfone, polyethersulfone, polyarylate, and polyimide. The optical film may include a modified film of the above described resin. Such modification may include copolymerization, branching, cross-linking, molecular terminal modification, and the like.

MODE FOR INVENTION

Next, the embodiments will be described in more detail with reference to examples. The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Example 1

A polyvinyl alcohol film (thickness: 60 μm, degree of polymerization: 2,400, degree of saponification: 99.0%, VF-PS6000, Kuraray Co. Ltd.) was swollen in an aqueous solution at 25° C. and stretched while being dyed in a dyeing bath containing an iodine ion at 30° C. The dyed polyvinyl alcohol film was further stretched in an aqueous solution of boric acid at 55° C. to obtain a final stretching ratio of 6. The obtained polyvinyl alcohol film was dried in a chamber of 100° C. for 1 minute to prepare a polarizer (thickness: 22 μm).

A polyethylene terephthalate resin was melt-extruded and stretched in an MD stretching ratio of 1 to 1.1 and a TD stretching ratio of 4 to 8 and subjected to a tension relaxation treatment one time at 100° C. to 150° C. to obtain a first protective film.

A polyethylene terephthalate resin was melt-extruded and stretched in an MD stretching ratio of 1 to 1.1 and a TD stretching ratio of 4 to 8 without being subjected to a tension relaxation treatment to obtain a fourth protective film.

The above prepared first protective film was adhered to a light exit surface, which was one surface of the above prepared polarizer by an adhesive layer, and a triacetyl cellulose film (Zero TAC) was adhered to a light incident surface, which was another surface of the polarizer by an adhesive layer (thickness 2 μm, UV curable adhesive) to prepare a viewer side polarizing plate. At this time, an absorption axis of the polarizer and the MD of the first protective film were made to be substantially parallel with each other.

The above prepared fourth protective film was adhered to a light incident surface, which was one surface of the above prepared polarizer by an adhesive layer, and a triacetyl cellulose film (Zero TAC) was adhered to a light exit surface, which was another surface of the polarizer by an adhesive layer (thickness: 2 μm, UV curable adhesive) to prepare a light source side polarizing plate. At this time, an absorption axis of the polarizer and the MD of the fourth protective film were made to be substantially parallel with each other.

A liquid crystal display device was prepared by adhering the viewer side polarizing plate on one surface of a liquid crystal panel and adhering the light source side polarizing plate on another surface of the liquid crystal panel. At this time, the absorption axis of the polarizer of the viewer side polarizing plate and the absorption axis of the polarizer of the light source side polarizing plate were made to be orthogonal to each other.

Example 2

A liquid crystal display device of Example 2 was prepared in the same manner as in Example 1, except that the first protective film was subjected to a tension relaxation treatment twice at 100° C. to 150° C. and the fourth protective film was not subjected to tension relaxation treatment.

Comparative Example 1

A liquid crystal display device of Comparative Example 1 was prepared in the same manner as in Example 1, except that only the viewer side polarizing plates were adhered to each surface of the liquid crystal panel.

Comparative Example 2

As in Example 1, the above prepared fourth protective film was adhered to a light exit surface, which was one surface of the above prepared polarizer by an adhesive layer, and a triacetyl cellulose film (Zero TAC) was adhered to a light incident surface, which was another surface of the polarizer by an adhesive layer (thickness: 2 μm, UV curable adhesive) to prepare a viewer side polarizing plate.

The above prepared first protective film was adhered to a light incident surface, which was one surface of the above prepared polarizer by an adhesive layer, and a triacetyl cellulose film (Zero TAC) was adhered to a light exit surface, which was another surface of the polarizer by an adhesive layer (thickness: 2 μm, UV curable adhesive) to prepare a light source side polarizing plate.

The viewer side polarizing plate was adhered to one surface of a liquid crystal panel and the light source side polarizing plate was adhered to another surface of the liquid crystal panel to prepare a liquid crystal display device. Each shrinkage and retardation of the protective films of the viewer side polarizing plates and the protective films of the light source side polarizing plates prepared in Examples and Comparative Examples was evaluated, and the results are shown in Table 1 below. MD shrinkage and TD shrinkage were calculated by Formulae 4A and 4B after treating a square shape specimen of a protective film obtained by cutting the protective film in 150 mm×150 mm (MD×TD) size for 30 minutes at 120° C.:

$$MD\ shrinkage=|L_2-L_1|/L_1\times 100 \quad \text{[Formula 4A]}$$

wherein, $L_1$ is an initial length of the specimen in MD, and $L_2$ is a length in MD after treating the specimen at 120° C. for 30 minutes, $$TD\ shrinkage=|L_4-L_3|/L_3\times 100 \quad \text{[Formula 4B]}$$

wherein, $L_3$ is an initial length of the specimen in TD, and $L_4$ is a length in TD after treating the specimen at 120° C. for 30 minutes.

Each retardation of the protective films was measured at a wavelength of 550 nm using AxoScan (Axometrics, Inc).

For each of the viewer side polarizing plates and the light source side polarizing plates prepared in Examples and Comparative Examples, MD shrinkage and TD shrinkage were calculated by Formulae 5A and 5B after treating a square shape specimen of the polarizer of the polarizing plate obtained by cutting the polarizer in 150 mm×150 mm (MD×TD) size for 30 minutes at 120° C.:

$$\text{MD shrinkage} = |L_2 - L_1|/L_1 \times 100 \quad \text{[Formula 5A]}$$

wherein, $L_1$ is an initial length of the specimen in MD, and $L_2$ is a length in MD after treating the specimen at 120° C. for 30 minutes, $$\text{TD shrinkage} = |L_4 - L_3|/L_3 \times 100 \quad \text{[Formula 5B]}$$

wherein, $L_3$ is an initial length of the specimen in TD, and $L_4$ is a length in TD after treating the specimen at 120° C. for 30 minutes.

In the above Formulae 4A, 4B, 5A and 5B, all units of a "length" is mm.

Panel warpage was evaluated for each of the liquid crystal display devices prepared in Examples and Comparative Examples as below, and the results are shown in Table 1 below.

Panel warpage (unit: mm): A specimen for measuring panel warpage was prepared by replacing the liquid crystal panel of the liquid crystal display device with a glass plate (0.5T) in each Examples and Comparative Examples. Initial warpage value was measured for the prepared specimen. Then, the specimen was being left at 60° C. for 120 hours, and warpage value was measured. Panel warpage was calculated by the difference between an initial warpage value and a warpage value after being left at 60° C. for 120 hours.

TABLE 1

|  | Protective film of a viewer side polarizing plate (First protective film) | | | Protective film of a light source side polarizing plate (Fourth protective film) | | | Viewer side polarizing plate | | Light source side polarizing plate | | |
| --- | --- | --- | --- | --- | --- | --- | --- | --- | --- | --- | --- |
|  | $R_e$ (nm) | MD shrinkage (%) | TD shrinkage (%) | $R_e$ (nm) | MD shrinkage (%) | TD shrinkage (%) | MD shrinkage (%) | TD shrinkage (%) | MD shrinkage (%) | TD shrinkage (%) | Panel warpage (mm) |
| Example 1 | 6210 | 0.8 | 0 | 6140 | 0.8 | 0.3 | 0.5 | 0 | 0.5 | 0.3 | 0.9 |
| Example 2 | 6850 | 0.8 | 0 | 6140 | 0.8 | 0.3 | 0.5 | 0 | 0.5 | 0.3 | 0.9 |
| Comparative Example 1 | 6210 | 0.8 | 0 | 6210 | 0.8 | 0 | 0.5 | 0 | 0.5 | 0 | 1.2 |
| Comparative Example 2 | 6140 | 0.8 | 0.3 | 6210 | 0.8 | 0 | 0.5 | 0.3 | 0.5 | 0 | 1.4 |

As shown in Table 1, in each polarizing plate of Examples, TD shrinkage of the fourth protective film is greater than TD shrinkage of the first protective film. Thus, panel warpage was improved even when the panel was left at a high temperature. However, in Comparative Example 1, TD shrinkage of the fourth protective film is the same with TD shrinkage of the first protective film. In addition, in Comparative Example 2, TD shrinkage of the fourth protective film is smaller than TD shrinkage of the first protective film. Therefore, panel warpage did not improve much as compared with the panel warpage in Examples.

Further, although not shown in Table 1, each polarizing plate of Examples suppressed rainbow mura.

It should be understood that various modifications, changes, alterations, and equivalent embodiments can be made by those skilled in the art without departing from the spirit and scope of the present invention.

The invention claimed is:

1. A liquid crystal display device comprising:
   a viewer side polarizing plate comprising a first polarizer and a first protective film formed on a light exit surface of the first polarizer;
   a liquid crystal panel; and
   a light source side polarizing plate comprising a second polarizer and a fourth protective film formed on a light incident surface of the second polarizer,
   wherein the viewer side polarizing plate, the liquid crystal panel, and the light source side polarizing plate are sequentially stacked, and wherein a TD (transverse direction) shrinkage of the fourth protective film is greater than a TD shrinkage of the first protective film.

2. The liquid crystal display device of claim 1, wherein the liquid crystal display has a TD shrinkage difference in a range of about 0.1% to about 0.4%, as represented by Formula 6:

$$\text{TD shrinkage difference} = \text{TD shrinkage of the fourth protective film} - \text{TD shrinkage of the first protective film.} \quad \text{[Formula 6]}$$

3. The liquid crystal display device of claim 1, wherein the first protective film has the TD shrinkage of about 0.1% or less and a MD (machine direction) shrinkage of about 0.7% to about 0.9%.

4. The liquid crystal display device of claim 1, wherein the first protective film has a value of (MD shrinkage−TD shrinkage) in a range of about 0.6% to about 0.9%.

5. The liquid crystal display device of claim 1, wherein the fourth protective film has the TD shrinkage of about 0.3% to about 0.4% and a MD shrinkage of about 0.7% to about 0.9%.

6. The liquid crystal display device of claim 1, wherein the fourth protective film has a value of (MD shrinkage−TD shrinkage) in a range of about 0.3% to about 0.6%.

7. The liquid crystal display device of claim 1, wherein each of the first protective film and the fourth protective film has an in-plane retardation of about 5,000 nm or more at a wavelength of 550 nm.

8. The liquid crystal display device of claim 1, wherein an in-plane retardation difference between the first protective film and the fourth protective film at a wavelength of 550 nm is about 800 nm or less.

9. The liquid crystal display device of claim 1, wherein each of the first protective film and the fourth protective film comprises a polyester film.

10. The liquid crystal display device of claim 9, wherein the polyester film comprises at least one resin selected from the group consisting of polyethylene terephthalate, polyethylene naphthalate, polybutylene naphthalate and polybutylene terephthalate.

11. The liquid crystal display device of claim 1, wherein the viewer side polarizing plate has a value of (MD shrinkage−TD shrinkage) in a range of about 0.4% to about 0.6%.

12. The liquid crystal display device of claim 1, wherein the light source side polarizing plate has a value of (MD shrinkage−TD shrinkage) in a range of about 0.1% to about 0.3%.

13. The liquid crystal display device of claim 1, wherein a second protective film is further formed on a light incident surface of the first polarizer, and a third protective film is further formed on a light exit surface of the second polarizer.

* * * * *